US008898781B2

(12) United States Patent
Buescher et al.

(10) Patent No.: US 8,898,781 B2
(45) Date of Patent: Nov. 25, 2014

(54) COMMUNICATIONS SYSTEM HAVING SECURITY APPARATUS, SECURITY APPARATUS AND METHOD HEREFOR

(75) Inventors: Armin Buescher, San Diego, CA (US); Thomas Siebert, Bottrop (DE)

(73) Assignee: G DATA Software AG, Bochum (DE)

( * ) Notice: Subject to any disclaimer, the term of this patent is extended or adjusted under 35 U.S.C. 154(b) by 125 days.

(21) Appl. No.: 13/429,098

(22) Filed: Mar. 23, 2012

(65) Prior Publication Data

US 2012/0266241 A1 Oct. 18, 2012

(30) Foreign Application Priority Data

Mar. 25, 2011 (DE) .......................... 10 2011 015 123

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/52* | (2013.01) |

(52) U.S. Cl.
CPC ..................................... *G06F 21/52* (2013.01)
USPC ................... 726/22; 726/23; 726/24; 726/25

(58) Field of Classification Search
USPC ................................................. 726/22–25
See application file for complete search history.

(56) References Cited

U.S. PATENT DOCUMENTS

| 2007/0055711 A1* | 3/2007 | Polyakov et al. ............. 707/203 |
| 2010/0115620 A1* | 5/2010 | Alme .............................. 726/24 |

OTHER PUBLICATIONS

"Rootkit," Wikipedia, http://en.wikipedia.org/wiki/Rootkit, Accessed Mar. 15, 2011, 14 pages.
Davis, M. et al., "Hacking Exposed Malware & Rootkits: Malware and Rootkits Secrets and Solutions," The McGraw-Hill Companies, pp. 284-318, Sep. 23, 2009, 35 pages.

* cited by examiner

*Primary Examiner* — Andrew Nalven
*Assistant Examiner* — Khang Do
(74) *Attorney, Agent, or Firm* — Alleman Hall McCoy Russell & Tuttle LLP

(57) ABSTRACT

The present invention relates to a communications system having at least one communications means by means of which the communications system can be connected to at least one further processing unit and/or to a further communications system, having at least one first memory means, having at least one second memory means and having at least one security apparatus, wherein identical information is stored on the first and second memory means and wherein damage to the communications system can be determined with reference to a comparison of this information by means of the security apparatus. The present invention furthermore relates to a security apparatus and to a method of determining damage to a communications system.

7 Claims, No Drawings

COMMUNICATIONS SYSTEM HAVING SECURITY APPARATUS, SECURITY APPARATUS AND METHOD HEREFOR

CROSS-REFERENCE TO RELATED APPLICATION

This application claims priority to German Patent Application No. 10 2011 015 123.0, entitled "Communications System Having Security Apparatus, Security Apparatus and Method Herefor", filed Mar. 25, 2011, which is hereby incorporated by reference in its entirety for all purposes.

TECHNICAL FIELD

The present invention relates to a communications system having a security apparatus, to a security apparatus and to a method herefor.

BACKGROUND AND SUMMARY

Communications systems, in particular computerized or computer-assisted communications systems, frequently utilize web browser applications to communicate with other communications systems or processing units, in particular to exchange data.

In this respect, the web browser applications use system libraries in which information on system interfaces is stored. These system interfaces are frequently manipulated, for example by direct attacks using malware. Such attacks make it possible to damage the communications system, in particular to impair it with respect to operating security or to block the communications system in part or in full. The malware can also be used to monitor operating data of the communications system.

It is therefore the object of the present invention to further develop a communications system having a security apparatus; a security apparatus; and a method herefor in an advantageous manner, in particular such that damage to the communications system can be recognized simply, fast and reliably.

This object is achieved in accordance with the invention by a communications system having at least one communications means by means of which the communications system can be connected to at least one further processing unit and/or to a further communications system is provided with at least one first memory means, with at least one second memory means, and with at least one security apparatus, wherein identical information is stored on the first and second memory means and wherein damage to the communications system can be determined with reference to a comparison of this information by means of the security apparatus. The technical problem of avoiding damage to the communications system can be advantageously solved by such a communications system, namely by the technical means of a security apparatus by means of which a comparison of corresponding information, in particular of redundantly held information, is made possible, and hereby a recognition of damage is made possible simply and reliably. A change to and/or manipulation of the information allows a secure and reliable recognition of damage to the communications system.

DETAILED DESCRIPTION

The detectability of damage by means of the security apparatus is generally also provided when the communications system is not and/or is only temporarily not connected to at least one further processing unit and/or one further communications system. A constant connection of the communications system to at least one further processing unit and/or one further communications system is not absolutely necessary.

The term of damage is to be understood and interpreted broadly in this respect. Damage can, for example, comprise that malware was installed on the communications system and/or that one or more functions of the communications system are impaired. Such an impairment can also already comprise information being able to be read without authorization, e.g. as a consequence of the installation of malware.

Damage to the communications system can thus be able to be determined by means of the security apparatus when the comparison of the information shows that the information does not coincide. To the extent that the comparison shows that a coincidence of the information is present, no damage can preferably be determined by means of the security apparatus. The current operating status can preferably be displayed to the user of the communications system, for example in the event of no damage, in the form of a message and/or a signal which can be faded in, and, in the case of damage, in the form of a warning message.

A secure and reliable recognition of damage to the communications system in turn makes it possible in an advantageous manner e.g. to repair the damage immediately. This can be done, for example, in that in the event of damage by unwanted installation of malware, this can be automatically recognized by means of the security apparatus and the execution of the malware is automatically prevented and e.g. a removal of the malware is carried out or can be carried out.

The communications system can be a processing unit and/or include a processing unit. Such a processing unit can, for example, be a computer, a laptop, etc. which can, however, also be embedded in a master communications system.

The communications system can include a web browser application or can be designed as a web browser application. This web browser application usually comprises system libraries which comprise information for the operation of the communications system. The web browser application can, for example, be a conventional web browser such as Microsoft Internet Explorer, Mozilla Firefox and/or Google Chrome.

It is furthermore conceivable that the communications means further comprises corresponding data exchange means such as data transmission interfaces. Such data transmission interfaces can enable a wired and/or wireless data exchange.

The security apparatus can be an extension to the communications means. It can, for example, be advantageously provided that the security apparatus is designed as a web browser extension.

The information stored in the memories can be information relating to characteristics of the communications system or can comprise such information.

It is conceivable that the first memory means is a working memory and the second memory means is a data storage device. The working memory can, for example, be a RAM memory and the data storage device can be a memory on a hard disk. It can be a local hard disk in this respect. It is, however, also conceivable that the second memory means is a memory on a non-local memory. Provision can in particular be made that a saving of information in the first memory takes place on the putting into operation of the communications system and the information is then always present in the hard disk memory.

It is also conceivable that the memory means, the RAM memory and/or the hard disk memory is or are only a part of the storage space in a RAM memory element available to the communications system or belonging to the communications system or of a hard disk of the communications system.

Provision can furthermore be made that the first memory means is a first memory having a system library in which at least one directory of the system interfaces provided by the system library is stored as information and that the second memory means is a second memory having a copy of the system library of the first memory in which at least one directory of the system interfaces provided by the system library is stored as information.

It is further conceivable that damage to the system interface, in particular a manipulation of the system interface, can be recognized by means of the security apparatus by at least a partial comparison of the first memory with the second memory. A monitoring of the system libraries used in the web browser, in particular a protection from manipulation of the system libraries used for communication or of the system interfaces stored in the system libraries, can thus take place by means of the security apparatus, for example. This is in particular advantageous because the system interfaces of these libraries are frequently manipulated by malware or while using malware to collect user entries such as user names and passwords on website forms before the encoding by the communications system.

Provision can furthermore be made that the system interfaces have entry points and that the information relating to the entry points can be calculated independently by means of the security apparatus and can be compared by means of the entry points calculated the communications system, with in particular damage being able to be detected by means of the security apparatus when a deviation of the entry points calculated by the security apparatus from the entry points calculated by the communications system can be determined or is determined by means of the security apparatus. It is, however, generally also conceivable that other comparable or suitable predefined data structures are used instead of entry points. The comparison and the recognition of deviations of these data structures and thus damage to the communications system can hereby be recognized in accordance with the aforesaid procedure by comparison of the entry points.

It is furthermore conceivable that a third memory means is provided and that a damaged system interface can be identified by at least one property of the system interface which is independent of the communications system and/or of properties of the communications system, with at least one property being able to be stored or being stored as information in the third memory element and with a checksum being able to be formed by means of the security apparatus using this information. This at least one property can advantageously be stored in a fixed order, e.g. in alphabetic order in a data structure. A checksum (hash sum) can thereupon be formed using this data structure. This property of the system interface can, for example, be the name of the system interface which is advantageously always the same independently of the system. A manipulated interface can thus therefore be identified by properties such as the name of the system interface which are independent of the specific system. This advantageously allows a recognition to be able to be carried out by means of the security apparatus independently of the system. It is also possible that the third memory means is only a part of the storage space in a memory available to the communications system or belonging to the communications system, with it not being absolutely necessary that the third memory element is a local storage space. In an advantageous embodiment, the third memory means can also be a component of the second memory means or can be identical with the second memory means.

Provision can moreover be made that the type of damage can be determined by means of the checksum in that the checksum is comparable by means of the security apparatus with checksums stored in the security apparatus and already known. It is, however, generally also conceivable to store the already known checksum not in the security apparatus, but rather in a separate memory means.

The advantage in particular now results through the communications system that the damage caused e.g. by malware can be recognized by the security apparatus or by means of the security apparatus by the communications system during the operation of the communications system. This damage can in particular be manipulations of system libraries of the communications means, in particular of the web browser application. The damage, in particular the manipulation, can be able to be made reversible for the duration of the execution by the security apparatus and the user of the communications system can be able to be informed accordingly. It is furthermore possible that the user can, on a successful identification of the malware by means of checksum, be informed by the communications system by means of the security apparatus of provided tools, where available, for the permanent removal of the malware or of the products generated by the malware.

The present invention furthermore relates to a security apparatus. Provision is accordingly made that a security apparatus is designed having the security apparatus features in accordance with one of the preceding claims.

The security apparatus can be a memory element on which in particular the functional features of the security apparatus are stored. Provision can also be made that the security apparatus is a computer program product. The security apparatus is preferably a security apparatus which is provided for use in a communications system in accordance with one of the claims 1 to 7.

The present invention furthermore relates to a method for determining damage to a communications system. Provision is accordingly made that in a method for determining damage to a communications system having at least one communications means by means of which the communications system can be connected to at least one further processing unit and/or to a further communications system, having at least one first memory means, having at least one second memory means and having at least one security apparatus, identical information is stored on the first and second memory means and damage to the communications system can be determined with reference to a comparison of this information by means of the security apparatus.

Provision can furthermore advantageously be made that the method is carried out using a communications system in accordance with one of the claims 1 to 7.

Further details and advantages of the invention will now be explained in more detail with reference to an embodiment described in the following.

An advantageous embodiment of a communications system in accordance with the invention can, for example, be in a simple embodiment a personal computer such as a PC, a tablet PC, a laptop or a netbook which is connected or connectable to the internet. The communications means of the communications system includes a web browser application as well as one or more interfaces by means of which the communications system can be connected to the internet and/or to another network.

It is generally also conceivable that the present invention can be carried out in connection with a smartphone, a gaming console or a comparable device. The communications system is in this case preferably the smartphone, the gaming console or the comparable device.

The security apparatus is designed as an extension object of the web browser application and is permanently stored or installed in a memory of the communications system.

Malware frequently manipulates the entry points in system interfaces (APIs) provided by the operating system. It is the aim of the present concept to recognize such manipulations and to identify the malware with reference to the type of manipulations.

A program library is loaded into a target process to be examined and checks whether entry points were changed in system interfaces of specific system libraries. In this respect, the following possible changes are to be considered:

(1) System libraries contain a directory of the system interfaces provided by them. This list can be manipulated by malware after the system library was loaded into the memory. Such manipulations can be recognized in that the directory in the memory is compared with the directory in the hard disk copy of the system library.

(2) Manipulations of the code of the system interfaces (inline hooking) are recognized by comparison with the corresponding code fragments of the hard disk copy of the system library.

(3) Further manipulations (e.g. by the loading procedure of the operating system) are recognized in that the entry points of the system interfaces calculated by the operating system are compared with independently calculated entry points.

The individual manipulated system interfaces are identified by properties which are independent of the specific system (e.g. the name of the system interfaces). These properties are stored in a fixed order (e.g. alphabetically) in a data structure. A checksum (hash sum) is thereupon formed using this data structure.

The resulting checksum can be used for identifying the malware in that the checksum is compared with already known checksums.

In an advantageous embodiment, the security apparatus can be an extension of the web browser application Microsoft Internet Explorer on the operating system Microsoft Windows. An implementation as an extension for web browsers of other manufacturers such as Mozilla Firefox and Google Chrome is possible with a technically very simple structure.

The purpose of the web browser extension is the monitoring of the system libraries used in the web browser, in particular the protection from manipulation of the libraries used for communication. This is necessary since the system interfaces of these libraries are frequently manipulated by malicious software to intercept user entries such as user names and passwords in website forms before the encoding by the system.

The extension recognizes the manipulations at system libraries in the web browser effected by malicious software and reverses them for the duration of the execution, advises the user and refers him, on a successful identification of the malicious software by means of a checksum, to provided tools, where available, for the permanent removal of the causative damaged files of the system.

The invention claimed is:

1. A communications system having at least one communications means by means of which the communications system is connectable to at least one further processing unit and/or to a further communications system, having at least one first memory, at least one second memory, at least one third memory, and at least one security apparatus, wherein identical information is stored on the first memory and the second memory and wherein damage to the communications system is determinable with reference to a comparison of information stored on the first memory and on the second memory by the security apparatus, wherein the first memory has a system library in which at least one directory of system interfaces provided by the system library is stored as information, and the second memory has a copy of the system library of the first memory in which at least one directory of the system interfaces provided by the system library is stored as information, wherein damaged system interfaces are recognized by the security apparatus by at least a partial comparison of the first memory with the second memory, wherein each damaged system interface is identified by at least one property of the respective system interface which is independent of the communications system and/or of properties of the communications system, the at least one property of each damaged system interface being stored together in a data structure in the third memory and a checksum being formed by the security apparatus based on the data structure, wherein the security apparatus determines a type of damage of the damaged system interfaces by comparing the checksum with an already known checksum stored in the security apparatus.

2. The communications system in accordance with claim 1, wherein the first memory is a working memory and the second memory is a data store.

3. The communications system in accordance with claim 1 wherein the system interfaces have entry points, wherein entry points calculated independently by the security apparatus and are compared with entry points calculated by the communications system, and wherein the security apparatus detects damage when a the entry points calculated by the security apparatus deviate from the entry points calculated by the communications system.

4. A method for determining damage to a communications system having at least one communications means by which the communications system is connectible to at least one further processing unit and/or to a further communications system, having at least one first memory, at least one second memory, at least one third memory, and at least one security apparatus, the method comprising:

storing identical information on the first memory and the second memory and determining damage to the communications system with reference to a comparison of the stored information on the first memory and on the second memory by the security apparatus, storing at least one directory of system interfaces provided by a system library of the first memory as information in the system library of the first memory, the second memory having a copy of the system library of the first memory in which at least one directory of the system interfaces provided by the system library is stored as information, recognizing damaged system interfaces via the security apparatus performing at least a partial comparison of the first memory with the second memory, identifying each damaged system interface by at least one property of the respective system interface which is independent of the communications system and/or of properties of the communications system, the at least one property of each damaged system interface being stored together in a data structure in the third memory and a checksum being formed by the security apparatus based on the data structure, determining a type of damage of the damaged system interfaces via the security apparatus comparing the checksum with an already known checksum stored in the security apparatus.

5. The method in accordance with claim 4, wherein the first memory is a working memory and the second memory is a data store.

6. The method of claim 4, wherein the system interfaces have entry points, the method further comprising calculating entry points independently by the security apparatus and comparing the entry points calculated by the security apparatus with entry points calculated by the communications system, the security apparatus detecting damage when the entry points calculated by the security apparatus deviate from the entry points calculated by the communications system.

7. A communications system, comprising:
at least one communications device by which the communications system is connected to at least one further processing unit and/or to a further communications system, having at least one first memory, at least one second memory, and at least one security apparatus, wherein identical information is stored on the first memory and the second memory and wherein damage to the communications system is determined with reference to a comparison of information stored on the first memory and on the second memory by the security apparatus,
wherein the first memory has a system library in which at least one directory of system interfaces provided by the system library is stored as information, and the second memory has a copy of the system library of the first memory in which at least one directory of the system interfaces provided by the system library is stored as information,
wherein damaged system interfaces are recognized by the security apparatus by at least a partial comparison of the first memory with the second memory,
wherein each damaged system interface is identified by at least one property of the respective system interface which is independent of the communications system and/or of properties of the communications system, the at least one property of each damaged system interface being stored together in a data structure in the third memory and a checksum being formed by the security apparatus based on the data structure,
wherein the security apparatus determines a type of damage of the damaged system interfaces by comparing the checksum with an already known checksum stored in the security apparatus.

* * * * *